INVENTORS.
WILLARD E. AINSWORTH
NORMAN C. HILL

BY Henry E Otto Jr
ATTORNEY

United States Patent Office
3,427,849
Patented Feb. 18, 1969

3,427,849

COMPONENT LEAD OFFSET BENDING APPARATUS

Willard E. Ainsworth, Endicott, and Norman C. Hill, Binghamton, N.Y., assignors to International Business Machines Corporation, Armonk, N.Y., a corporation of New York Filed Mar. 17, 1967, Ser. No. 623,875
U.S. Cl. 72—296 10 Claims
Int. Cl. B21d *11/10, 45/04;* B21f *1/00*

ABSTRACT OF THE DISCLOSURE

An apparatus for concurrently providing double offset right angle bends intermediate the ends of a plurality of parallel non-aligned wire leads of a component while maintaining the offset end portions of each such leads substantially parallel.

*Background of invention*

This invention relates to apparatus for effecting bends in at least one relatively long and thin cylindrical or tubular member, and more particularly to apparatus for effecting double offset bends of predetermined included angles concurrently in a plurality of initially parallel but non-aligned relatively long and thin members to provide, with a minimum of abrasion, respective knees extending in different directions but each joining end portions which are maintained mutually parallel.

U.S. Patent 2,902,691 shows that it is broadly old to provide double offset right angle bends in an axial lead component like a resistor to facilitate "standoff" of the component from a circuit to which it is mounted; but the member and anvil using punch-and-die techniques that undesirably abrade the leads. U.S. Patent 996,064 shows a device for providing a double offset bend in a pipe through relative motion between two open-sided guides or dies (FIG. 9) carried by jaw members; but with that device, excessive slippage of the pipe undesirably occurs because of the manner of support of the pipe and angle of application of the bending forces thereto. Also that pipe-bending device clearly is unsuitable for bending component leads with automated high throughput techniques; and such a device is incapable of achieving offset bending where the offset distance is small and the angle of offset is great.

*Summary of the invention*

According to the invention, a double offset bend is provided in a substantially straight relatively long thin member by apparatus in which abrasion and neck down of the member is desirably minimized to such a degree as to make it practical for deforming fine wire with small offsets. This apparatus comprises gripping jaws for holding one end portion of the member stationary, while a forming jaw is moved sequentially in a prescribed closed loop path. As illustrated, the forming jaw is initially moved upward and axially of the member into surrounding relation with the other end portion of the member, then obliquely upward and laterally so as to permit the unconstrained intermediate portion of the member defined between said end portions to bend as necessary to provide a double offset bend of equal included angles while said end portions are maintained mutually parallel. After the bend has been achieved, the forming jaw is moved vertically downward so as to withdraw it from overlying relationship with the member; and then the jaw is moved further downward and laterally to its initial position, completing a parallelogram path in preparation for another work cycle on another member which will have been advanced automatically to the work station during such downward lateral movement of the jaw means.

This apparatus is especially suitable for providing double offset bends concurrently in a plurality of parallel non-aligned leads projecting from the body of an electrical component, such as a transistor; and, when so used, a separate independently movable forming jaw is provided for each lead to be bent, and the respective forming jaws during the upward lateral movement move obliquely outward in generally radial directions to provide offset bends that fan out radially from the axis of the component.

*Description of preferred embodiment*

Figure 1A:
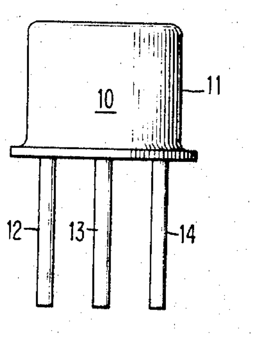
FIGS. 1A and 1B constitute an elevational view and a bottom view, respectively, of a transistor before its three leads are offset and bent by apparatus embodying the invention.
Figure 2A:
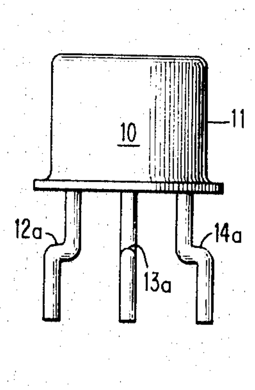
FIGS. 2A and 2B constitute an elevational view and a bottom view, respectively, of the transistor of FIG. 1 after its three leads have been bent by said apparatus.
Figure 1B:
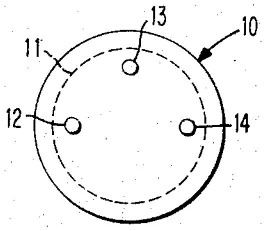
Figure 2B:
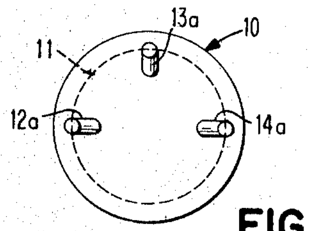

As illustrated in FIGS. 1A and 1B, a transistor 10 comprises a body 11 from which project three substantially parallel but non-aligned wire leads 12, 13, 14 spaced equal distances from the transistor axis. Lead 13 is disposed at 90° to diametrically arranged leads 12, 14. Each of these leads has been previously cut to the same preselected length by suitable means (not shown). The apparatus herein disclosed concurrently provides double right angle bends or knees 12*a*, 13*a* and 14*a* (see FIGS. 2A and 2B) in the respective leads 12, 13, 14.

Figure 3:
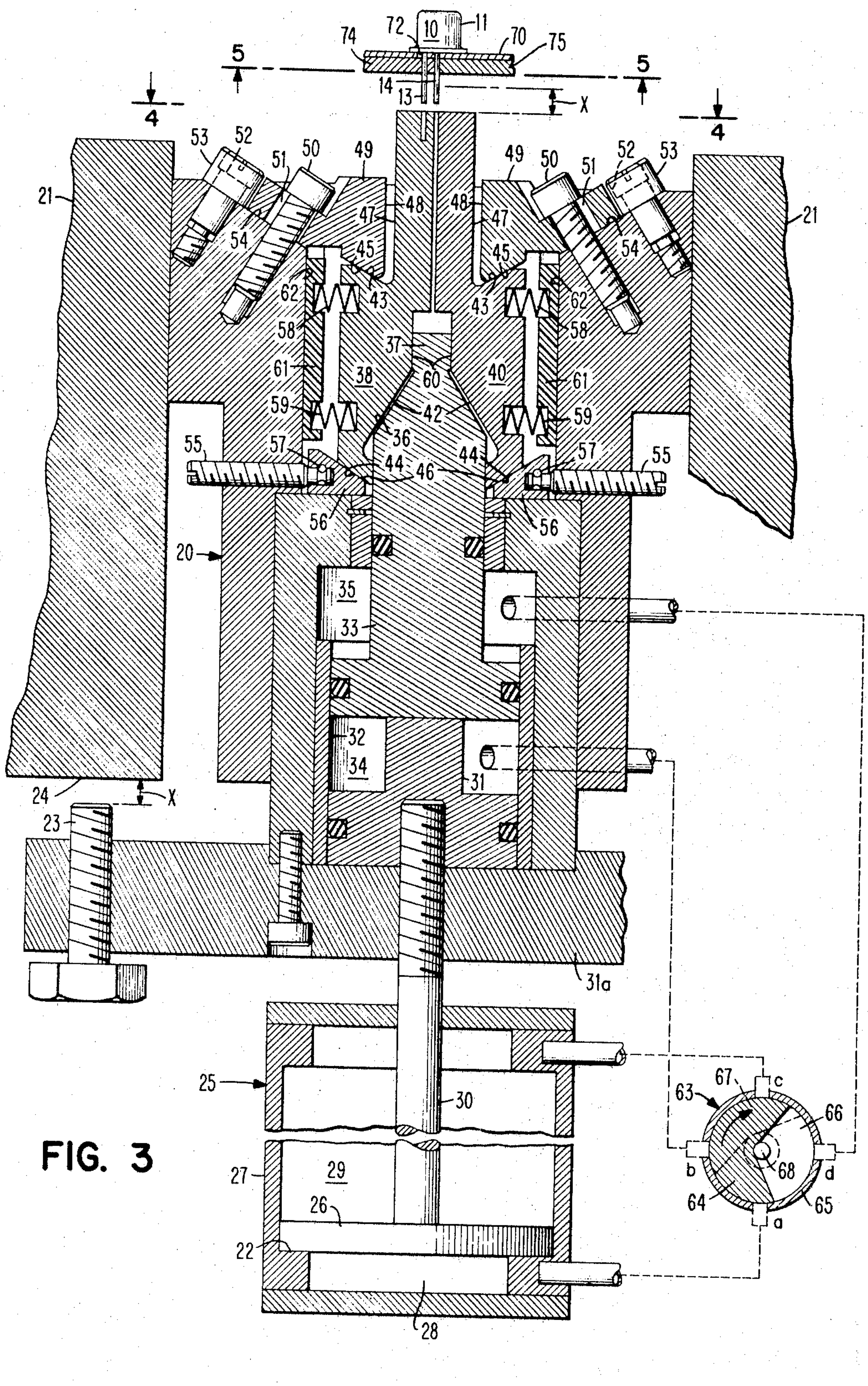
FIG. 3 is a central vertical section of an apparatus embodying the invention.

As illustrated in FIG. 3, the apparatus embodying the invention comprises a sectionalized casing 20 which is vertically reciprocable within a fixed guide 21 between a lower position, defined by contact with a fixed surface 22, and an upper position, defined by contact of an adjustable screw 23 with a stop surface 24 on guide 21. An air cylinder 25 comprises a piston 26 reciprocable in a sectionalized casing 27 and subject opposingly to pressures of fluid in chambers 28, 29. Piston 26 is operably connected to casing 20 via a piston rod 30 that is screw-thread connected to a spacer block 31 and end plate 31*a*. Casing 20 has a central bore 32 within which is slidably mounted a piston 33 that is subject opposingly to pressures of fluid in chambers 34, 35. Piston 33 has a tapered or truncated conical surface 36 that is joined at its upper end to a reduced diameter central stop portion 37 adjacent the upper end of the piston.

Four forming jaws 38, 39, 40, 41 (see FIG. 4) are disposed about the surface 36 and piston portion 37, one such jaw occupying each quadrant position. Each forming jaw 38–41 comprises a beveled flat surface 42 having the same angularity as surface 36; and each such jaw also has two parallel inclined surfaces 43, 44 each of which extend upwardly and outwardly in a direction at right angles to the corresponding surface 42. As piston 33 moves upwardly relative to casing 20 upon supply of pressure fluid to chamber 34, piston surface 36 contacts each jaw surface 42 and through such contact moves the corresponding jaw upwardly and outwardly away from the piston axis in a path as prescribed by sliding contact of inclined surfaces 43, 44 with guide surfaces 45, 46, respectively. Such outward movement ceases when each jaw 38–41 attains an upper limit position defined by contact of its respective surface 47 thereof with a corresponding stop surface 48 that is provided on an associated adjustable member 49 that also provides the corresponding guide surface 45.

For each jaw 38–41, the clearance between surfaces 47, 48 is adjusted by loosening a locking screw 50 that passes through an elongated slot 51 in the corresponding member 49 and is screw-threaded into casing 20; then loosening a set screw 52 that is screw-threaded into casing 20 and locks an eccentric 53; and then rotating the eccentric to move surface 47 relative to surface 48 and guided by elongated slot 51 as necessary to provide the desired uniform clearance, as measured by a feeler gage; and finally tightening screws 50 and 52 to anchor the member 49 and eccentric 53 in their adjusted positions. Member 49 is supported on a casing surface 54 that is parallel to surface 45 so that when the clearance between surfaces 47, 48 is adjusted, no cocking will occur and proper contact will be maintained between surfaces 43, 45.

Associated with each jaw 38–41 is a respective adjusting screw 55 that has screw-threaded engagement with casing 20 and has an unthreaded shank that projects into an aligned bore in a corresponding wedge-shaped member 56 that provides the guide surface 46 for that particular jaw. A pin 57 passes through cooperating grooves in each member 56 and shank to operatively connect these elements so that rotation of screw 55 will effect translational movement of member 56 toward or away from the axis of piston 33, thus providing a means for eliminating vertical play of each jaw between its corresponding upper and lower guide surfaces 45, 46, respectively.

Respective pairs of helical springs 58, 59 bias each of the jaws 38–41 down the inclined planar surfaces 45, 46 to a normal position defined by contact of a jaw surface 60 with the reduced diameter central stop portion 37 of the piston 33 as shown. Each spring 58, 59 nests in the side of an associated jaw 38–41 and seats in a respective recess in a corresponding Teflon slide 61 that rides in a vertical slot 62 in casing 20 to enable the springs to move outwardly with the jaw without cocking while maintained under compression between the slide and jaw.

Pressure fluid is supplied to the chambers 28, 34, 29 and 35 in the overlapping sequence hereinafter to be described by suitable valve means. For the sake of simplification, this valve means is illustrated as a valve device 63 comprising a cylindrical valve 64 rotatably mounted in a housing 65 and suitably recessed to define, in cooperation with the housing, a supply chamber 66 and an exhaust chamber 67. Supply chamber 66 may be maintained charged with pressure fluid from above from a supply port (not shown) centered over the axis of valve shaft 68; and exhaust chamber 67 may be maintained vented from below, for example by way of an annular clearance space between the shaft and housing 65. It is to be understood that the valve 64 is so recessed that, as it rotates clockwise, supply chamber 66 is successively uncovered to the upper half portions of the delivery ports *a, b, c, d*, while concurrently the exhaust chamber 67 is uncovered to the lower half portions of the delivery ports *d, a, b, c*.

A carrier 70 supports the body of each transistor 10, and the transistor leads 12, 13, 14 project downwardly through elongated slots 71, 72, 73 (FIG. 5) in the carrier. These slots are of such direction and dimension as to permit withdrawal of the transistor upwardly from the carrier after the offset bends 12*a*, 13*a*, 14*a* (FIG. 2) have been provided in the leads. For sake of illustration, the carrier 70 may be in the form of an endless metal strip or belt that carries a series of uniformly spaced transistors 10 in a direction toward the reader as viewed in FIG. 3, intermittently stopping at the inception of each work cycle at the work station illustrated in FIGS. 3, 4 and 5.

Figures 4, 6, 7:
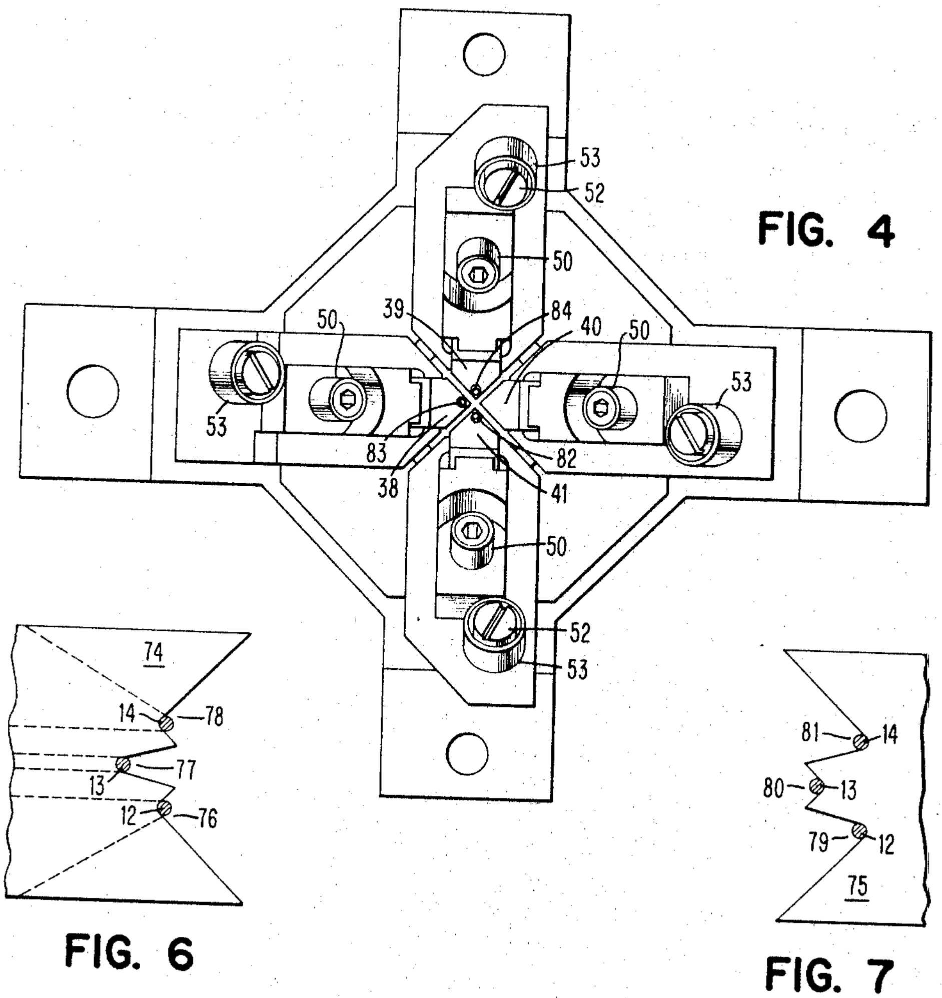
FIG. 4 is a plan view taken along the line 4—4 of FIG. 3.
FIGS. 6 and 7 are fragmentary plan views of the left and right gripping jaws shown in assembled overlying relationship in FIG. 5.
Figure 5:
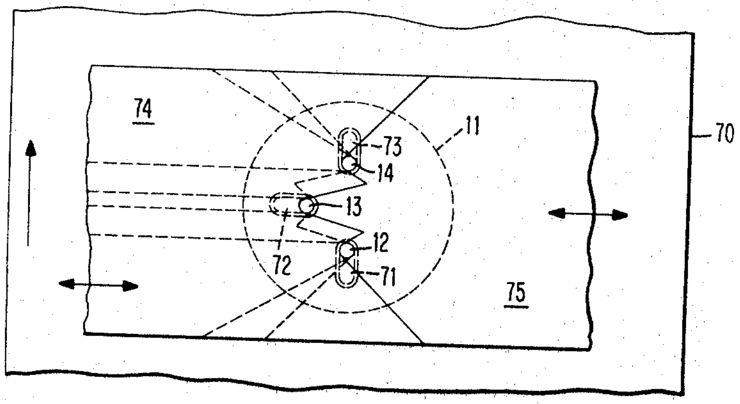
FIG. 5 is a fragmentary plan view taken along the line 5—5 of FIG. 3.

As soon as the carrier stops at the work station, suitable drive means (not shown) advance two gripping jaws 74, 75 (FIG. 5) toward each other. These jaws 74, 75 have overlying end portions with complementary toothed configurations as shown in FIGS. 6 and 7. More specifically, lower jaw 74 has three adjacent notches 76, 77, 78 defined by V-shaped intersecting surfaces preferably rounded at their apices to partially surround the left sides of leads 12, 13, 14, respectively; and upper jaw 75 has three adjacent notches 79, 80 and 81 defined by V-shaped surfaces likewise rounded at their apices to partially surround the right sides of leads 12, 13, 14, respectively. Thus as adjacent end portions of lower and upper jaws 74, 75 move toward each other and into overlying relationship as shown in FIG. 5, the upper parts of leads 12, 13, 14 will be successively guided and "combed" into the respective recesses and then gripped at opposite sides between said jaws to hold the transistor body 11 and upper parts of said leads stationary. Movement of the jaws 74, 75 together and apart may be controlled by a fluid pressure motor (not shown) operative to spread the jaws only between work cycles; i.e., while the carrier 70 is moving one component from the work station and a new component to the work station.

*Summary of operation*

Assume initially that carrier 70 has conveyed a transistor 10 to the work station and is now stopped; that valve device 63 is positioned to charge chamber 35 with pressure fluid and vent chambers 34 and 29; and that the gripping jaws 74, 75 have been moved together and now firmly grasp the upper parts of the leads 12, 13, 14 to hold them and the transistor body 11 stationary. Under these assumed conditions, the various components of the apparatus will be in the respective positions in which they are shown in FIGS. 3, 4 and 5 of the drawings.

Thereafter, as valve 64 rotates clockwise as viewed in FIG. 3, pressure fluid will be supplied to chamber 28. This will cause piston 26 to move upward and, through piston rod 30, move the entire sectionalized casing 20 upward through the preselected distance X until screw 23 contacts stop surface 24. During this upward movement of casing 20, there will be no relative movement between piston 33 and casing 20; and the forming jaws 38–41 will move vertically upward through distance X into overlying relationship with the lower ends of leads 12, 13, 14, which are received in bores 82, 83, 84 (see FIG. 4), in jaws 41, 38, 39, respectively. It is to be noted that after the forming jaws 38–41 have moved upward through this distance X, an intermediate portion of each lead between the upper ends of the forming jaws and the undersides of the gripping jaws 74, 75 will be unconstrained and free to bend.

As valve 64 continues to rotate, it will successively vent chamber 35 and then supply pressure fluid to chamber 34, while maintaining chamber 28 charged. This will cause piston 33 to move upward away from block 31 and hence relative to casing 20; and through contact of piston surface 36 with the inclined surfaces 42 of the respective forming jaws 38–41, these jaws will be driven upwardly and outwardly between the spaced parallel guide surfaces 45, 46 until such movement is stopped by contact of the surface 47 of each jaw with the stop surface 48 on each corresponding member 49. Meanwhile, during this upward and outward movement, the above-described unconstrained intermediate portion of each lead will be offset and bent to provide the double offset right angle bends or knees 12a, 13a, 14a (FIG. 2) in the manner which will now be explained.

Figure 8A:
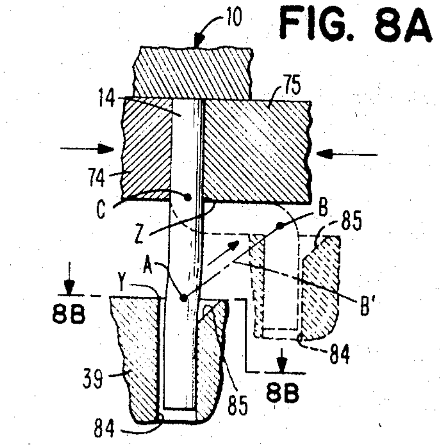
FIG. 8A is an enlarged fragmentary section view of a portion of the apparatus shown in FIG. 3, illustrating diagrammatically how each lead is bent to achieve the desired offset.
Figure 8B:
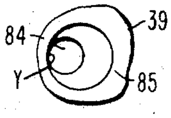
FIG. 8B is a fragmentary plan view taken along the line 8B—8B of FIG. 8A.

As illustrated in FIG. 8, a beveled countersink 85 is provided in the upper end of each of the jaws 38–41, the countersink being coaxially aligned with the upper portion of the respective lead as held clamped between jaws 74, 75; and the bore 84 in jaw 39 (as well as the bores 82, 83 in jaws 41, 38 respectively) preferably have their axes parallel to but slightly offset radially inward from the axis of the countersink, such that the edges of the countersink and bore will coincide at Y to provide a sharp right angle working surface that will form the desired right angle bend in the lower part of knee 14a. The beveled countersink 85 thus provides a funnel-like aperture to assure that each lead will always be guided into the associated bore without endwise interference and thus increases the reliability of the apparatus during automatic operation. As each jaw moves obliquely upward and outward from the axis of the clamped transistor 10 to its upper limit position, the right angle surface Z of gripping jaw will concurrently form the desired right angle bends to create the respective knees 12a, 13a, 14a.

According to an important feature of the invention, the guide surfaces 45, 46 constrain each of the jaws 38–41 to move upwardly and outwardly from the transistor axis in an oblique path corresponding to A–B (FIG. 8) which defines the chord of an imaginary arc swung substantially from a point C. Points A and B correspond to the lower axial end of the unconstrained portion of the lead respectively before and after the bending operation; and point C corresponds to the upper axial end of the unconstrained portion. In the apparatus embodying the invention, relative slippage, abrasion and necking down of each lead has been minimized substantially by having the jaws move in the straight path corresponding to the chord A–B.

Assume now that the jaws are in their uppermost oblique positions; and that the double offset right angle bends have been formed as shown in FIG. 8A. As valve 64 continues to rotate clockwise, chamber 28 will be vented and pressure fluid will then be supplied to chamber 29, while chamber 34 is maintained charged. This will cause piston 26 through piston rod 30 to move the entire casing 20 downward through the distance X to its lower position defined by contact with stop surface 22. Meanwhile, since chamber 34 is still charged, piston 33 and hence jaws 38–41 will be held in their upper and extended positions as said jaws are withdrawn straight downward through the distance X.

Thereafter, as valve 64 continues to rotate clockwise, it will successively vent chamber 34 and then supply pressure fluid to chamber 35, while maintaining chamber 29 charged. Hence, piston 33 will be driven downwardly into contact with block 31, thus enabling springs 58, 59 to move the respective jaws 38–41 obliquely downward and inward toward the axis of piston 33 until jaw surfaces 60 strike the stop portion 37 of the piston. The work cycle will thereupon have been completed and the apparatus will have been restored to the position in which it is shown in FIG. 3. The carrier 70 will now move toward the reader, as viewed in FIG. 3, and advance the next succeeding transistor 10 to the work station before valve 64 has rotated sufficiently to once again supply pressure fluid to chamber 28 for initiating the work cycle on the transistor now present at the work station. Thus, during each successive work cycle, each jaw 38–41 will be moved in a parallelogram-type "closed loop" path, initially upward distance X, then obliquely upward along line A–B, then downward distance X, and finally obliquely downward and inward parallel to A–B to the point of beginning.

Figure 9:
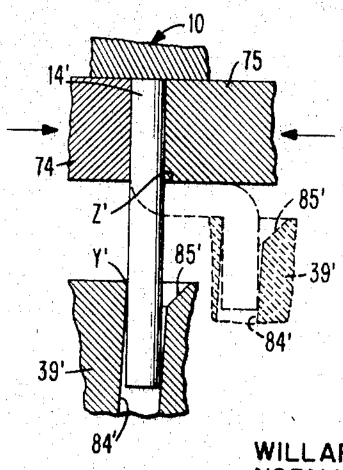
FIG. 9 is a view similar to FIG. 8 showing a forming jaw modified according to a variation of the invention.

It will be apparent that the apparatus embodying the invention may be modified in certain minor respects, if desired. For example, if the sharp right angle bend is not essential or desired at point B (FIG. 8A), bore 84 may be disposed concentrically with countersink 85. Also, the double offset bends need not be right angles; for example, by limiting the degree of upward movement from A to B′ (instead of B), as shown in FIG. 8A, a double offset bend with equal included angles of approximately 135° could be provided. Also, according to a variation of the invention as shown in FIG. 9, jaw 39′ may be provided with an oversize bore 84′ having an axis that is canted slightly (e.g., about 2–5°) from the vertical to compensate for the oversize bore 84′ and also for "spring back" of the lead wire 14′.

It will thus be seen that the electrical component (transistor 10) remains basically at rest while the gripping jaws 74, 75 grip the upper end portions of the lead wires and the forming jaws 38–41 receive the lower end portions of said wires and move in a substantially ideal path whereby the lead wires are bent with near geometric perfection. The apparatus is capable of working on components having lead wires that protrude from these components on a very small pin circle and/or have very short center-spacings. In automatically operable apparatus embodying the invention, three double offset right angle bends of the type herein disclosed have been provided concurrently at a throughput rate of over two transistors per second; the degree of tension and compression of the lead wires has been so minimized that at no point is the diameter of the lead reduced as much as 10%; and bending of the transistor lead wires is accomplished without cracking the wire-to-glass seal.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for providing double offset bends in a substantially straight relatively long and thin member, comprising:

first means for constraining one end portion of the member against movement, second means having an aperture for surrounding with slight clearance the other end portion of the member, means for moving said first means and second means relatively toward each other in one path substantially parallel to the axis of the member to bring the aperture into surrounding relationship with said other end portion of the member so as to provide between said end portions an unconstrained and unsurrounded intermediate portion, and means for thereafter causing movement of said second means relative to said first means and member in another path having initial and terminal points corresponding to those subtended by an imaginary arc swung from a point substantially at the junction of said one portion and intermediate portion to cause said unconstrained intermediate portion to bend as necessary to provide double offset bends of substantially equal included angles.

2. Apparatus according to claim 1, wherein said second means moves in said other path and throughout such movement serves to maintain said other end portion substantially parallel to said one end portion.

3. Apparatus according to claim 1, including:

two means each independently adjustable for adjusting the amount of movement in said one path and other path, for correspondingly controlling the length of such intermediate portion and magnitude of said included angles, respectively.

4. Apparatus according to claim 1, wherein:

said second means at the entrance to the aperture has a beveled countersink to facilitate threading of the member into the aperture, and the aperture is offset relative to the countersink so as to provide a relatively sharp edge coincident with one edge of the countersink to assist in forming the member during movement of said second means in said other path.

5. Apparatus according to claim 4, wherein the axis of the aperture is canted slightly relative to the axis of said one end portion of the member.

6. Apparatus according to claim 1, wherein:

said other path is a straight line corresponding substantially to the chord of the subtended arc, and the degree of offset bending is defined at least in part by contact of the member with said first means.

7. Apparatus according to claim 1, wherein said first means comprises a pair of gripping jaws movable toward and away from each other and having interacting notched surfaces for grippingly engaging opposite sides of the member.

8. Apparatus for providing offset bends concurrently in an electrical component or the like having a body and a plurality of parallel non-aligned leads projecting from the body, comprising:

first means for substantially surrounding the portions of each lead adjacent the body and constraining said portions against movement, second means having apertures for receiving with slight radial clearance the end portions of each lead remote from the body, means for advancing said second means into overlying relationship with such remote end portions so as to provide for each lead an intermediate portion that lies unconstrained and unsurrounded by said first means and second means, other means for thereafter causing said second means to move the apertures outwardly relative to the axis of the component so as concurrently to deform the intermediate portions of each of the leads as necessary to create in each of the leads offset bends that diverge outwardly substantially equal amounts from the axis of the component, and said other means including means for so constraining movement of said second means as to cause the latter to maintain the remote end portions of each of the respective leads substantially parallel to their corresponding first-mentioned portions while such offset bends are being created.

9. Apparatus according to claim 8, wherein:

said second means comprises a plurality of independently movable elements, one for each lead to be bent, and each such element has an aperture for receiving the remote end portion of said lead, and said elements are moved concurrently as a unit by said advancing means into such overlying relationship, and thereafter moved independently in different directions by said other means outwardly from the component axis to create the offset bends.

10. Apparatus according to claim 8, wherein:

said second means comprises a plurality of independently movable elements, each having a lead-receiving aperture, and said other means comprises a member having a tapered surface for successively contacting and then spreading apart said independently movable elements concurrently, and the means for constraining movement of the second means includes guide means providing guide surfaces engageable by guide surfaces on said elements, said guide surfaces being disposed at right angles to said tapered surface.

References Cited

UNITED STATES PATENTS

| | | | |
|---|---|---|---|
| 1,778,559 | 10/1930 | Kondakjian | 72—316 |
| 2,902,691 | 9/1959 | Kwasniewski | 72—401 |
| 2,964,085 | 12/1960 | Ghiringhelli | 72—306 |
| 3,106,945 | 10/1963 | Wright et al. | 72—383 |
| 3,147,779 | 9/1964 | Brown | 140—105 |
| 3,220,238 | 11/1965 | Senger | 72—381 |

CHARLES W. LANHAM, *Primary Examiner.*

RONALD D. GREFE, *Assistant Examiner.*

U.S. Cl. X.R.

72—306, 316, 400; 140—105